P. HEIN.
BRIQUET COOLING APPARATUS
APPLICATION FILED DEC. 17, 1914.
1,165,408.
Patented Dec. 28, 1915.
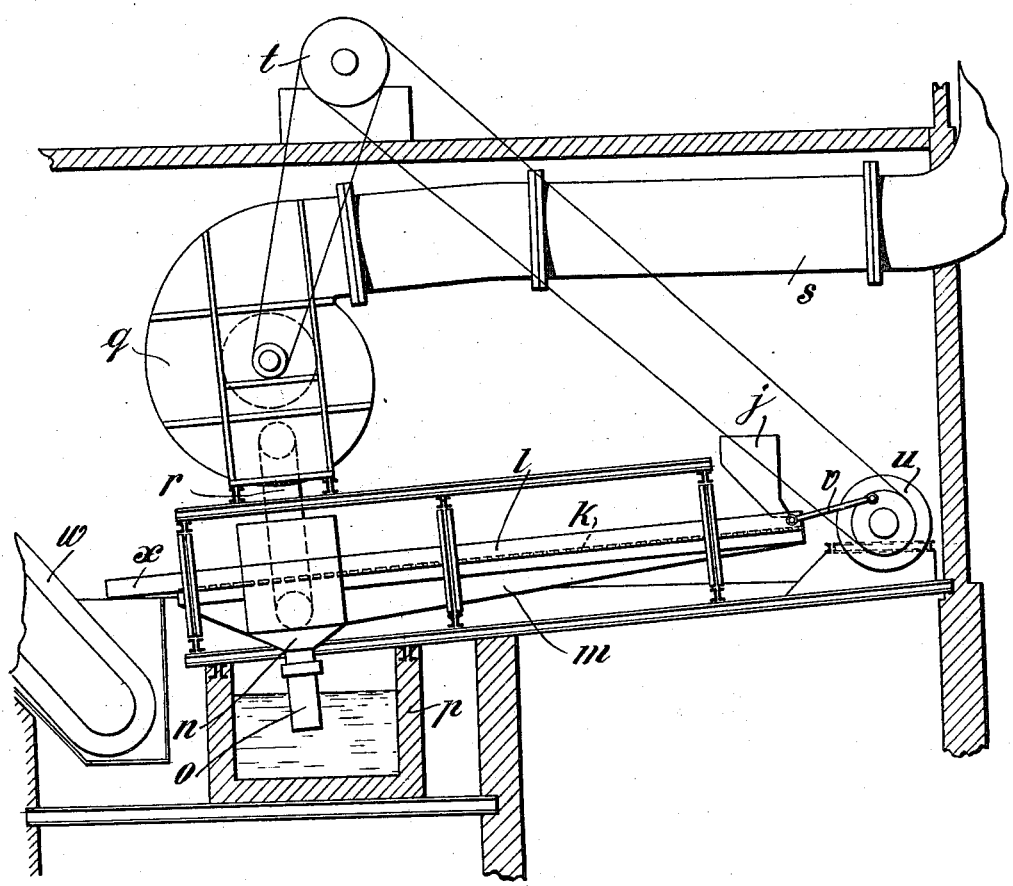

UNITED STATES PATENT OFFICE.

PAUL HEIN, OF ESSEN-RUETTENSCHEID, GERMANY, ASSIGNOR TO DIAMANT-BRIKETT-WERKE G. M. B. H., OF BERLIN, GERMANY.

BRIQUET-COOLING APPARATUS.

1,165,408.  Specification of Letters Patent.  Patented Dec. 28, 1915.

Application filed December 17, 1914. Serial No. 877,755.

*To all whom it may concern:*

Be it known that I, PAUL HEIN, director, a subject of the King of Prussia, and residing at Essen-Ruettenscheid, in the Kingdom of Prussia and German Empire, have invented certain new and useful Improvements in Briquet-Cooling Apparatus, of which the following is a specification.

In manufacturing briquets from coal-dust or the like agglutinants must be employed which are either soluble or insoluble in water. In case of briquets being manufactured by means of an agglutinant soluble in water, such as molasses or cellulid, that is the concentrated lye obtained from the sulfid cellulose manufacture in the production of paper out of wood, the briquets must be subjected to a special treatment in order to render the agglutinant insoluble so that the briquets will be proof against atmospheric influences. To this end the briquets are subjected for a certain time to a temperature of about 250° to 300° C. or a still higher temperature for the purpose of decomposing the agglutinant and transforming the same into coke or carbon or a carbon-like matter, which is insoluble in water. As soon as the agglutinant is sufficiently decomposed or coked the briquets are withdrawn from the oven or kiln in which they have been heated, and allowed to cool in the open air. For the purpose of expediting the cooling effect of the open air it is customary to sprinkle the briquets with water on their way to the railway-car or to the yard where they are to be stored. This method of treating the hot briquets on their way from the kiln to the car or the yard is not always sufficient to purify and cool them off enough to prevent the danger of subsequent spontaneous ignition in the railway-car or at the yard where they are piled up. It must be understood that the briquets contain in their superficial pores carbon gas more particularly carbon monoxid (CO) resulting from the coking operation they have undergone in the kiln and, moreover, carry with them carbon dust. Both the carbon gas and the said carbon-dust are readily inflammable so that the presence of the gas and the dust increases the danger of spontaneous ignition. It is therefore of utmost importance to remove the gas and dust from the briquets during the cooling operation. For that purpose the briquets are usually treated on their way from the kiln to the car or yard with cold water or the like. Water, however, is objectionable for the reason that the hot briquets get cracks and fissures by the action of the cold liquid and therefore are liable to disintegration and decay when exposed to atmospheric influences.

My invention relates to a new apparatus for treating and cooling briquets made of coal, or the like with the aid of a soluble binder or agglutinant, such as cellulid, and which are heated, as above mentioned, for the purpose of coking the binder. According to my invention the hot briquets on their way from the kiln to the car or yard are subjected to the action of a blast or current of cold air forced by a blower, fan or ventilator preferably either across or in opposite direction to the path of the traveling briquets. The new apparatus consists of a box or casing through which the briquets are carried from the kiln to the car or yard, in combination with a means for forcing and sucking atmospheric air through said box or casing preferably across the path of the briquets. The casing may consist of a trough-shaped vessel having an inclined reciprocating cover of wire-cloth or the like over which the briquets pass from the kiln to the place of storage or transportation.

The accompanying drawing shows a side view, partly in section, of my new apparatus.

The briquets discharged from the kiln (not shown) drop through the funnel $j$ onto the wire-cloth $k$ of the cover or frame $l$ on top of the box or casing $m$. The latter has an inclined bottom the lowest part of which forms a funnel $n$ with a depending tube $o$ attached thereto.

$p$ is a vessel or basin filled with water to such a level that the open mouth of the depending tube $o$ is within the water.

$q$ is a ventilator adapted to suck out the air from the box $m$ by means of a pipe $r$. $s$ is the ventilator-pipe, $t$, $u$ is a gearing for giving the cover $l$ a reciprocating movement by means of the link $v$ whereby the briquets on the wire-cloth $k$ of the cover $l$ are caused to advance stepwise on the cloth toward the elevator $w$ into which they drop from the cover $l$ at the left-hand end thereof.

The operation is as follows: The briquets dropping from the kiln into the funnel $j$ and onto the wire-gauze $k$ are stepwise forwarded on the latter toward the end $x$ of the cover $l$ owing to the inclination of the box $m$ with its cover $l$ and further owing to the pushing reciprocatory motion the cover $l$ receives from the link $v$. At the end $x$ of the cover $l$ the briquets drop into the elevator $w$. During their travel on the wire-cloth $k$ the briquets are freed from coal-dust and coal-gas by the atmospheric air being forcibly sucked into the box $m$ through the wire-cloth $k$ by means of the ventilator $q$. The coal-gas thus being sucked off the briquets escapes with the air through the ventilator $q$ and the pipe $s$ into the atmosphere while the coal dust and small particles collect at the inclined bottom of the box $m$ and drop through the funnel $n$ and pipe $o$ into the water basin $p$, from which they can be, from time to time, removed to be used again in the making of briquets.

What I claim is:

An apparatus for cooling coked briquets comprising a closed case, an inclined cover having perforations, a means adapted to place the coked briquets onto said cover, a means adapted to give the said cover a reciprocal movement to advance the briquets stepwise thereon toward the lower end of said cover; a means for sucking atmospheric air through the said cover, a funnel with a depending tube at the lowest part of the bottom of said case, and a basin adapted to be filled with water into which the said tube dips.

In testimony whereof I have affixed my signature in presence of two witnesses.

PAUL HEIN.

Witnesses:
J. WIJNEN,
J. D. ZIESERKY.